United States Patent
Su

(10) Patent No.: US 7,987,408 B2
(45) Date of Patent: Jul. 26, 2011

(54) DATA BUFFERING METHOD

(75) Inventor: Chun-Yuan Su, Taipei (TW)

(73) Assignee: Via Technologies, Inc., Taipei (TW)

( * ) Notice: Subject to any disclaimer, the term of this patent is extended or adjusted under 35 U.S.C. 154(b) by 1317 days.

(21) Appl. No.: 11/550,263

(22) Filed: Oct. 17, 2006

(65) Prior Publication Data

US 2007/0130411 A1    Jun. 7, 2007

(30) Foreign Application Priority Data

Oct. 28, 2005   (TW) ................................ 94137881 A

(51) Int. Cl.
    *G11C 29/00*    (2006.01)
(52) U.S. Cl. ..................................................... 714/765
(58) Field of Classification Search .................... 714/765
    See application file for complete search history.

(56) References Cited

U.S. PATENT DOCUMENTS

| | | | | |
|---|---|---|---|---|
| 5,553,265 | A | * | 9/1996 | Abato et al. .................. 711/143 |
| 6,381,532 | B1 | * | 4/2002 | Bastian et al. ................ 701/114 |
| 2004/0103262 | A1 | * | 5/2004 | Glossner et al. .................. 712/4 |

* cited by examiner

*Primary Examiner* — Guy J Lamarre
(74) *Attorney, Agent, or Firm* — Kirton & McConkie; Evan R. Witt

(57) ABSTRACT

In a data processing and buffering method, at least one read cycles are asserted to obtain at least one data, respectively, wherein each of the data includes at least one sub data and each data is specified with an address pointer and an enable bit array. When a certain sub data is received, the corresponding bit of the enable bit array is enabled. The corresponding sub data of the enabled bit is indicated by the address pointer.

13 Claims, 3 Drawing Sheets

DATA BUFFERING METHOD

FIELD OF THE INVENTION

The present invention relates to a data buffering method, and more particularly to a method for buffering data transmitted from an upstream device to a bus via a bus controller.

BACKGROUND OF THE INVENTION

In a computer system, data are read, processed and transferred via a bus system as illustrated in FIG. 1, wherein a CPU (Central Processing Unit) 10, a core logic chip) 11 and a bus 12 are shown. In response to a read cycle, the data required by a bus master (not shown) is processed by the CPU 10 and transferred to the bus master via a bus controller 110 disposed in the core logic chip 11 and the bus 12. When a plurality of read cycles are asserted for reading a series of data, the data, after being processed by some types of CPU, e.g. AMD K8 processor, might be transferred to the bus 12 randomly. Therefore, a data buffer 1100 disposed in the bus controller 110 works to reorder data so that the data can be transferred to the bus 12 in order. For example, the CPU 10 processes data in response to read cycle 1, read cycle 2, read cycle 3 and read cycle 4 to obtain data 1, data 2, data 3 and data 4, respectively. However, the four data transferred to the bus 12 may be in a sequence of data 3, data 4, data 1 and data 2. For reordering the four data, all the data received earlier but sequenced later will be temporarily stored in the data buffer 1100 until the data sequenced prior thereto are transferred. In the above example, previously received data 3 and data 4 have to be stored in the data buffer 1100 until data 1 and data 2 are transferred to the bus 12. In other words, the space of the data buffer is ineffectively occupied and much of the resource is wasted.

SUMMARY OF THE INVENTION

A data processing and buffering method according to an embodiment of the present invention includes steps of: asserting at least one read cycles to obtain at least one of data, respectively, wherein each of the data includes at least one sub data and each data being specified with an address pointer and an enable bit array, wherein each bit of the enable bit array corresponds to one of the sub data and a value of the address pointer indicates a bit of the enable bit array; then enabling a corresponding bit of the bit enable array when receiving a sub data and transferring the corresponding sub data when the enabled bit of the enable bit array is indicated by the value of the address pointer.

A data buffering method for transferring a data from a data buffer to a bus, the data includes n sub data, and the method includes steps of: receiving and storing a sub data of the data in the data buffer; then determining if the received sub data is in the highest transfer priority among the sub data of the data having not been transferred to the bus according to an enable bit array having n bits respectively corresponding to the n sub data and an address array having n kinds of value for respectively indicating the n bits of the enable bit array; and then transferring the received sub data from the data buffer to the bus when the received sub data is determined to be in the highest transfer priority among sub data of either the first data or the second data.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
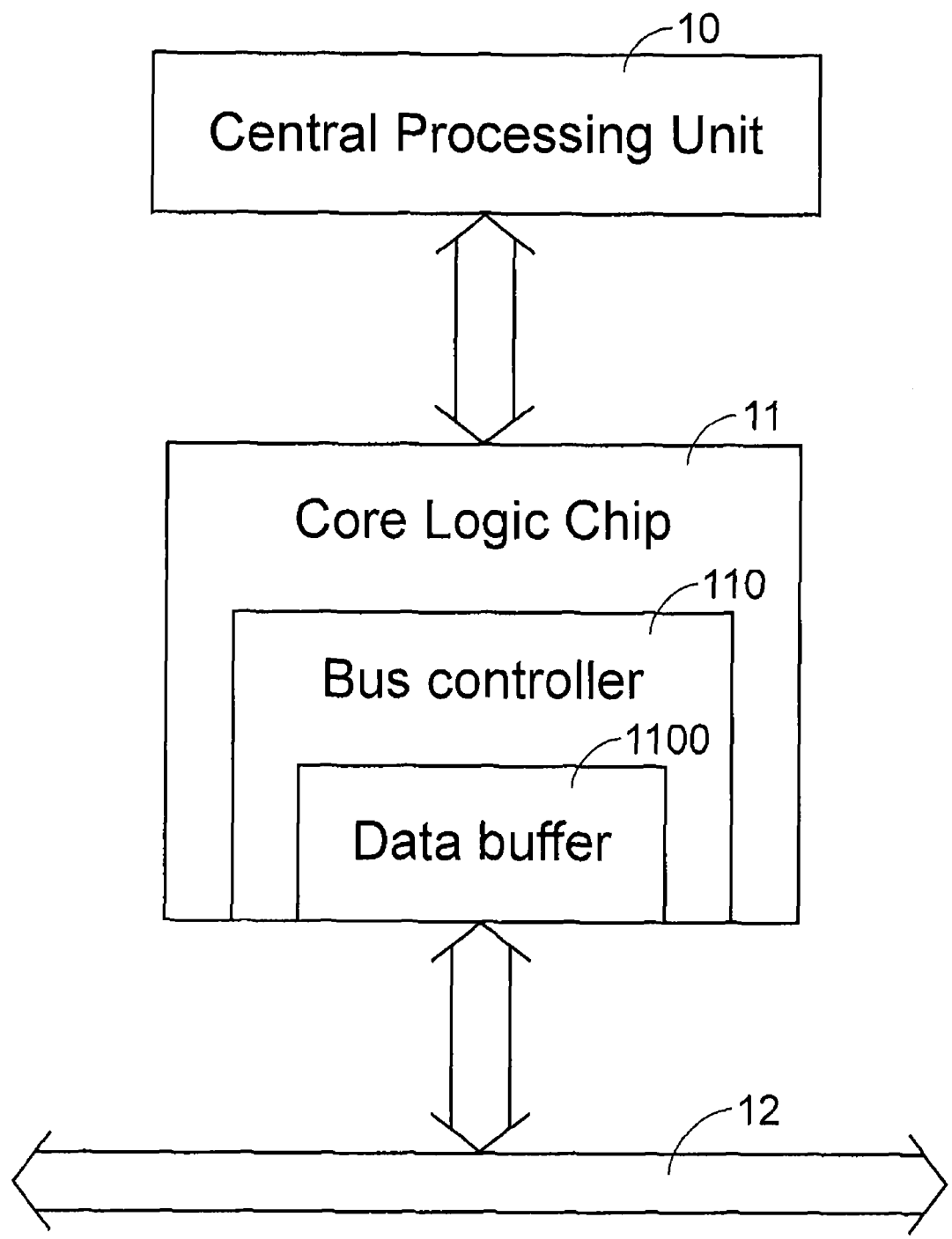
FIG. 1 is a functional block diagram illustrating a bus system.

For making use of the data buffer and opportunely releasing the space of the data buffer, in advanced bus specification, e.g. PCI Express or PCI-X, the data processed and outputted in response to different read cycles do not have to be transferred to the bus in order. Nevertheless, it is still necessary to sequentially transfer subordinate data in response to the same read cycle to assure of correct data.

In order to facilitate the operation of the new bus system, a data buffering method is provided according to the present invention to well sort the subordinate data while effectively releasing the buffer space. An embodiment of the data buffering method is illustrated in the flowchart of FIG. 2.

First of all, for easy illustration of the present method, the complete data responding to a read cycle is defined as a data, and each subordinate data responding to the same read cycle is defined as a sub data. In other words, a complete data is transferred to the bus in response to a read cycle with a plurality of sub data. An address pointer, MFP, and an enable bit array, EBA, are used to specify the states of the plurality of sub data of the data. Assuming the data includes n sub data, the EBA has n bits for respectively indicating each corresponding sub data, and the value of the MFP is used to indicate the position of the bits in the EBA. When receiving a sub data, the corresponding bit of the EBA is enabled (i.e. logic "1"). When the bit that the MFP indicated is enabled, the corresponding sub data is transferred. After the sub data is transferred, the corresponding bit of the EBA is reset (i.e. logic "0"), and the value of the MFP is added by 1 to indicate the next bit of the EBA for transferring the next sub data. The detailed description is given hereinafter and summarized in the flowchart of FIG. 2.

For transferring the data with n sub data, an address pointer MFP and an enable bit array EBA are used for reordering the data, which are preset to be respective initial values (Step 21). For example, the address pointer MFP is set to be zero, and the enable bit array EBA is set to be an array with n zero bits. When data have been processed by the CPU 10 and ready to be transferred to the bus via the bus controller 110, the n sub data are respectively received and temporarily stored in the data buffer 1100. When receiving the sub data, the bit in the EBA corresponding to the received sub data is enabled (i.e. the bit is switched from "0" into "1") (Step 22). Afterwards, the address pointer MFP is checked (Step 23). If the bit of the EBA indicated by the MFP is enabled (i.e. logic "1"), the corresponding sub data is transferred from the data buffer to the bus for releasing the buffer space (i.e. the bit is reset to "0") (Step 24). Then, the value of the MFP is added by 1 to indicate the position of the next bit in the EBA for transferring the next sub data (Step 25). If the bit of the EBA indicated by the MFP is not enabled (i.e. logic "0"), back to Step 12. The procedures are repeated until all the n sub data are received and transferred.

Figure 2:
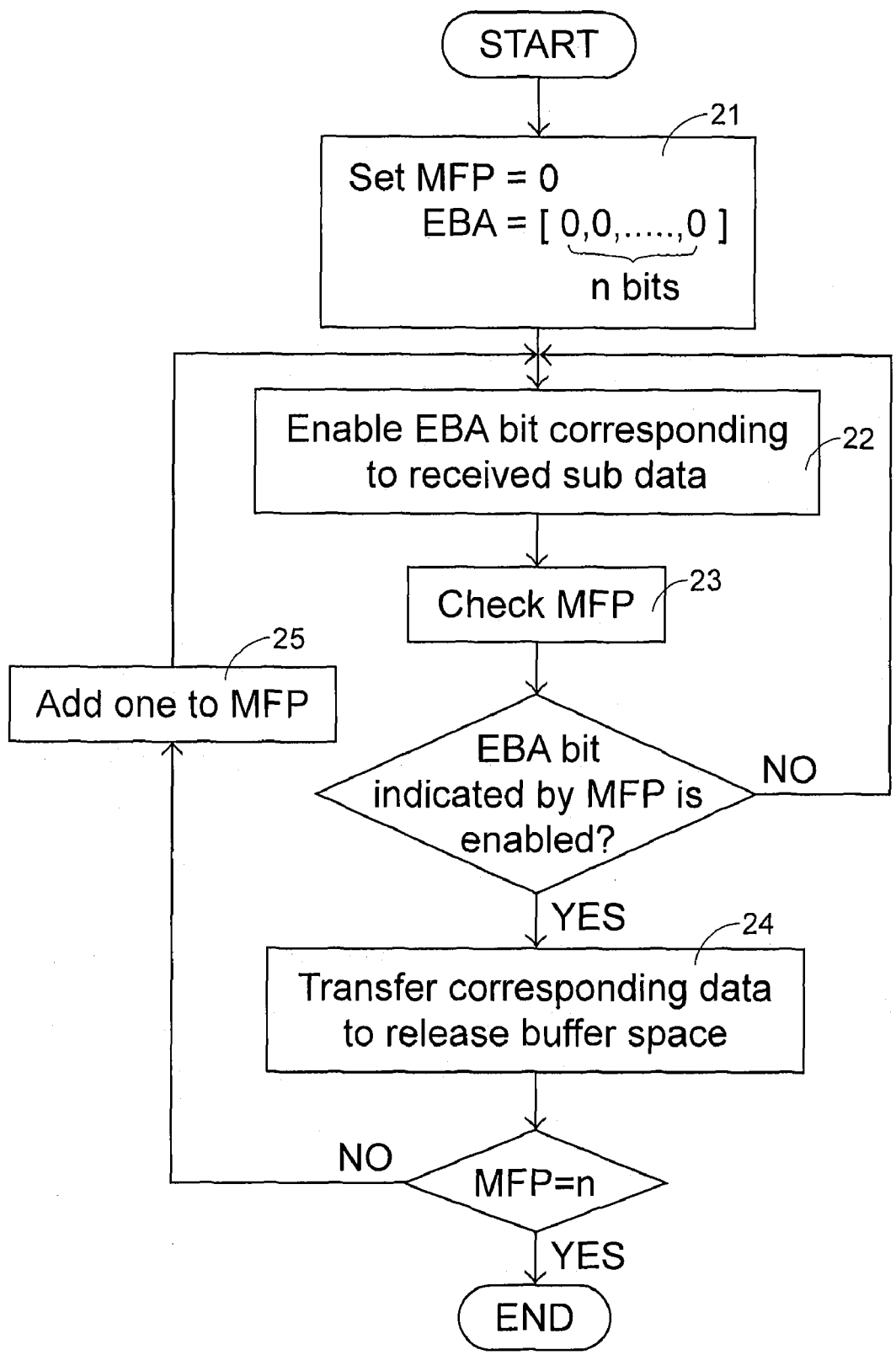
FIG. 2 is a flowchart illustrating a data buffering method according to an embodiment of the present invention.
Figure 3:
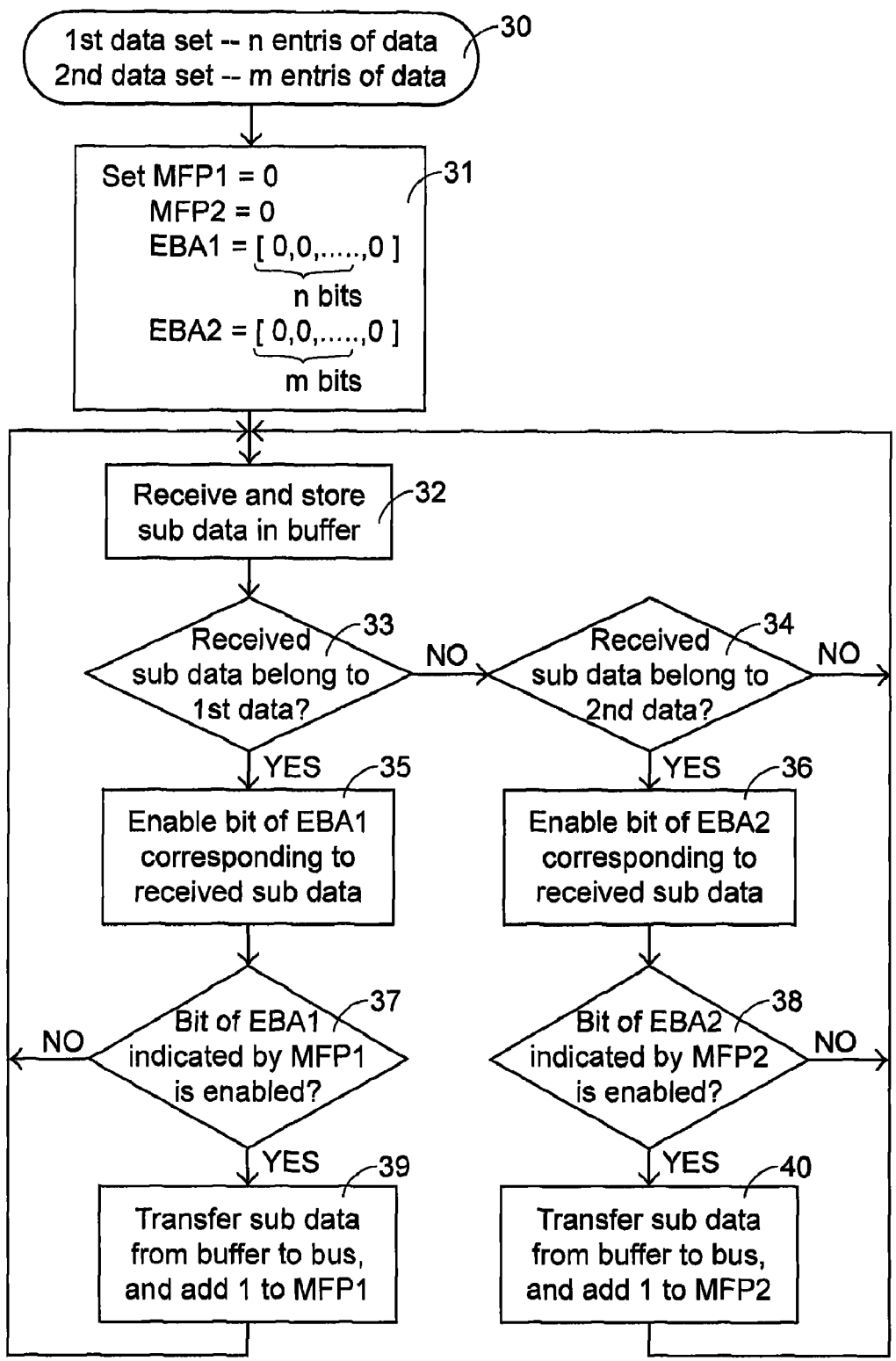
FIG. 3 is a flowchart illustrating a data buffering method according to another embodiment of the present invention.

In the embodiment of FIG. 2, the data buffering process for processing a data with n sub data is illustrated. It is to be noted that there can be more than one data simultaneously processed according to the present method, but for easy and clear illustration purpose, only one data is exemplified herein, and further data can be processed in a similar manner. The data buffering process illustrated in FIG. 3 is one of the examples, which processes a first data with n sub data and a second data with m sub data.

In practice, the data receiving and storing procedures can be performed simultaneously with the sub data transferring in the flowchart, and the data receiving and storing progress depends on the capacity of the data buffer 1100. Furthermore, one and more sub data belonging to the same or different data could be received and stored in the data buffer 1100 at the same time.

An example is given herein for illustration. In this example, four data are processed by the CPU and transferred in response to four read cycles, and each of the four data has four sub data. The 16 sub data: d0, d1, d2, d3 (the first data), d4, d5, d6, d7 (the second data), d8, d9, d10, d11 (the third data), d12, d13, d14 and d15 (the fourth data) are respectively received and stored in the data buffer randomly, and will be reordered as follows.

When one sub data is completed processing, a completion signal will be issued so that the sub data is checked and determined whether to be immediately transferred or not. In a case, assuming that the sixteen sub data are received in a sequence of d2, d3, d4, d6, d1, d9, d11, d14, d15, d8, d5, d7, d0, d13, d12 and d10, either one sub data received at a sampling time or a plurality of sub data received at the same sampling time, the sub data is checked one by one according to the data buffering method of FIG. 2.

First of all, each of the four address pointers MFP1, MFP2, MFP3 and MFP4 is preset to be "0" to respectively indicate the first bit of each corresponding enable bit array EBA1, EBA2, EBA3 and EBA4. Meanwhile, all the four bits in each of the enable bit arrays EBA1, EBA2, EBA3 and EBA4 are preset to be "0", too. That is,
MFP1=0, EBA1=[d0, d1, d2, d3]=[0, 0, 0, 0];
MFP2=0, EBA2=[d4, d5, d6, d7]=[0, 0, 0, 0];
MFP3=0, EBA3=[d8, d9, d10, d11]=[0, 0, 0, 0]; and
MFP4=0, EBA4=[d12, d13, d14, d15]=[0, 0, 0, 0].

Assuming there are three sub data d2, d3 and d4 received and stored in the data buffer 1100, the enable bit arrays EBA1, EBA2, EBA3 and EBA4 become:
MFP1=0, EBA1=[d0, d1, d2, d3]=[0, 0, 1, 1];
MFP2=0, EBA2=[d4, d5, d6, d7]=[1, 0, 0, 0];
MFP3=0, EBA3=[d8, d9, d10, d11]=[0, 0, 0, 0]; and
MFP4=0, EBA4=[d12, d13, d14, d15]=[0, 0, 0, 0].

Since the first bit of the second enable bit array EBA2 indicated by MFP2 is "1", the corresponding sub data d4 is transferred from the data buffer 1100 to the bus 12 even though there has been no sub data responding to the earliest read cycle (the first and the second sub data d2 and d3) transferred. Meanwhile, the buffer space previously occupied by the sub data d4 is released. Afterwards, the first bit of the second enable bit array EBA2 is reset and the second address pointer MFP2 is added by 1 to indicate the second bit of the second enable bit array EBA2. That is,
MFP1=0, EBA1=[d0, d1, d2, d3]=[0, 0, 1, 1];
MFP2=1, EBA2=[d4, d5, d6, d7]=[0, 0, 0, 0];
MFP3=0, EBA3=[d8, d9, d10, d11]=[0, 0, 0, 0]; and
MFP4=0, EBA4=[d12, d13, d14, d15]=[0, 0, 0, 0].

Assuming there are another eight sub data d6, d1, d9, d11, d14, d15, d8, d5 received and stored in the data buffer 1100, the enable bit arrays EBA1, EBA2, EBA3 and EBA4 become:
MFP1=0, EBA1=[d0, d1, d2, d3]=[0, 1, 1, 1];
MFP2=1, EBA2=[d4, d5, d6, d7]=[0, 1, 1, 0];
MFP3=0, EBA3=[d8, d9, d10, d11]=[1, 1, 0, 1]; and
MFP4=0, EBA4=[d12, d13, d14, d15]=[0, 0, 1, 1].

Since the second bit of the EBA2 indicated by MFP2 is "1", the corresponding sub data d5 is transferred from the data buffer 1100 to the bus 12 while releasing the buffer space previously occupied by the data d5. In addition, since the first bit of the EBA3 indicated by MFP3 is also "1", the corresponding sub data d8 is transferred from the data buffer 1100 to the bus 12 while releasing the buffer space previously occupied by the data d8. Afterwards, the second bit of EBA2 and the first bit of EBA3 are reset. The second address pointer MFP2 and the third address pointer MFP3 are respectively added by 1 to respectively indicate the next bit of EBA2 and EBA3. In other words, MFP2 and MFP3 become "2" and "1" to respectively indicate the third bit of EBA2 and the second bit of EBA3. Noticed that the third bit in the EBA2 indicated by MFP2 and the second bit of MFP3 indicated by MFP3 are "1", therefore, the corresponding sub data d6 and d9 are also transferred from the data buffer 1100 to the bus 12. Then, the third bit of the second enable bit array EBA2 and the second bit of the third enable bit array EBA3 are reset, and the second address pointer MFP2 and the third address pointer MFP3 are further added by 1. That is:
MFP1=0, EBA1=[d0, d1, d2, d3]=[0, 1, 1, 1];
MFP2=3, EBA2=[d4, d5, d6, d7]=[0, 0, 0, 0];
MFP3=2, EBA3=[d8, d9, d10, d11]=[0, 0, 0, 1]; and
MFP4=0, EBA4=[d12, d13, d14, d15]=[0, 0, 1, 1].

In the above example, the sub data are transferred in a sequence of d5, d8, d6 and d9. Alternatively, it is also feasible to process the third data firstly so that the sequence is d8, d5, d9 and d6, depending on a preset arbitration mechanism, or the data in the same data can be processed first, e.g. in a sequence of d5, d6, d8 and d9 or d8, d9, d5 and d6. The arbitration mechanism can be a Round Robin mechanism or a fixed priority mechanism, which are well known to those skilled in the art. Moreover, the sub data belong to the same data and adjacent to each other in sequence can be transferred as a group. For example, the data d5 and d6 can be integrated and then transferred, and so do the data d8 and d9. The size of the integrated data transferable at a time has to meet the requirement of the bus specification, e.g. the max-payload-size rule of a PCI Express specification.

Afterwards, assuming that data d7, d0 and d13 are received and stored in the data buffer 1100, the enable bit arrays EBA1, EBA2, EBA3 and EBA4 become:
MFP1=0, EBA1=[d0, d1, d2, d3]=[1, 1, 1, 1];
MFP2=3, EBA2=[d4, d5, d6, d7]=[0, 0, 0, 1];
MFP3=2, EBA3=[d8, d9, d10, d11]=[0, 0, 0, 1]; and
MFP4=0, EBA4=[d12, d13, d14, d15]=[0, 1, 1, 1].

Accordingly, the sub data d0, d1, d2 and d3 of the first data can be transferred from the data buffer to the bus one by one, portion by portion, or as a whole. On the other hand, the remaining sub data d7 of the second data can be transferred to complete the second read cycle. After the read cycle is completed, the address pointer is reset. The resulting address pointers and enable bit arrays are:
MFP1=0, EBA1=[d0, d1, d2, d3]=[0, 0, 0, 0];
MFP2=0, EBA2=[d4, d5, d6, d7]=[0, 0, 0, 0];
MFP3=2, EBA3=[d8, d9, d10, d11]=[0, 0, 0, 1]; and
MFP4=0, EBA4=[d12, d13, d14, d15]=[0, 1, 1, 1].

Finally, assuming that the data d12 and d10 are received and stored in the data buffer 1100, the enable bit arrays EBA1, EBA2, EBA3 and EBA4 become:
MFP1=0, EBA1=[d0, d1, d2, d3]=[0, 0, 0, 0];
MFP2=0, EBA2=[d4, d5, d6, d7]=[0, 0, 0, 0];
MFP3=2, EBA3=[d8, d9, d10, d11]=[0, 0, 1, 1]; and
MFP4=0, EBA4=[d12, d13, d14, d15]=[1, 1, 1, 1].

Accordingly, the data d12, d13, d14 and d15 of the fourth data can be transferred from the data buffer to the bus one by one, portion by portion, or as a whole. On the other hand, the remaining data d10 and d11 of the third data can be transferred to complete the third read cycle.

MFP1=0, EBA1=[d0, d1, d2, d3]=[0, 0, 0, 0];
MFP2=0, EBA2=[d4, d5, d6, d7]=[0, 0, 0, 0];
MFP3=0, EBA3=[d8, d9, d10, d11]=[0, 0, 0, 0];
MFP4=0, EBA4=[d12, d13, d14, d15]=[0, 0, 0, 0];

It is to be noted that for illustrating purpose, a term "position" is used above to show the sequential relationship among the sub data. As a matter of fact, the "position" of a certain data in an enable bit array means the priority or order of that data. In other words, the address pointer and the enable bit array are used for each data to locate the sub data in the highest transfer priority among the sub data having not been transferred to the bus. Even if two or more sub data belonging to different data are received, the associated address pointers and the enable bit arrays will facilitate to locate and transfer respective sub data in highest transfer priority independently.

By using the data buffering method of the present invention, the data responding to the same read cycle can be efficiently transferred in order and buffer space can be opportunely released for further use.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A data processing and buffering method, comprising steps of:
    asserting at least one read cycle to obtain at least one data with at least one sub data, each data being specified with an address pointer and an enable bit array, wherein each bit of the enable bit array corresponds to one of the sub data and a value of the address pointer indicates a bit of the enable bit array;
    enabling a corresponding bit of the enable bit array when receiving a sub data; and
    transferring the corresponding sub data when the enabled bit of the enable bit array is indicated by the value of the address pointer.

2. The method according to claim 1 further comprising a step of resetting the enabled bit after the corresponding sub data is transferred.

3. The method according to claim 1 further comprising a step of adding the value of the address pointer by one to indicate next bit of the enable bit array after transferring the corresponding sub data.

4. The method according to claim 3 further comprising a step of transferring next corresponding sub data when the next bit of the enable bit array is enabled.

5. The method according to claim 1 wherein when two or more adjacent bits including the bit indicated by the value of the address pointer are enabled, the corresponding two or more sub data are transferred one after one.

6. The method according to claim 1 wherein when two or more adjacent bits including the bit indicated by the value of the address pointer, the corresponding two or more sub data are transferred as a whole.

7. The method according to claim 1 wherein when two or more bits of different enable bit arrays are enabled and indicated by values of respective address pointers at the same time, the corresponding two or more sub data are transferred in a sequence determined by an arbitration mechanism.

8. A data buffering method for transferring a data from a data buffer to a bus, the data including n sub data, and the method comprising steps of:
    receiving and storing a sub data of the data in the data buffer;
    determining if the received sub data is in the highest transfer priority among the sub data of the data having not been transferred to the bus according to an enable bit array having n bits respectively corresponding to the n sub data and an address pointer having n kinds of value for respectively indicating the n bits of the enable bit array; and
    transferring the received sub data from the data buffer to the bus when the received sub data is determined to be in the highest transfer priority among sub data of either the first data or the second data.

9. The method according to claim 8 further comprising steps of:
    detecting whether there is any additional sub data having been stored in the data buffer and having a transfer priority next to the transfer priority of the received sub data when the received sub data is determined to be in the highest priority; and
    integrating the additional sub data with the received sub data and transferring the integrated sub data from the data buffer to the bus when the integrated sub data comply with a criterion.

10. The method according to claim 9 wherein the integrated sub data comply with the criterion when a size of the integrated sub data meets the requirement of a max-payload-size rule.

11. The method according to claim 8 wherein the received sub data is determined to be in the highest transfer priority if the value of the address pointer currently indicates the bit of the enable bit array corresponding to the received sub data.

12. The method according to claim 11 wherein the value of the address pointer is updated to indicate next bit after the received sub data is transferred, so as to determine next sub data in the highest transfer priority among the sub data having not been transferred to the bus.

13. The method according to claim 8 wherein each of the n bits of the enable bit array is preset to be "0", and a bit is switched to "1" when a corresponding sub data is received and then switched back to "0" after the corresponding sub data is transferred.

* * * * *